INVENTOR.
HAROLD S. PLATT
BY
Mason, Kolehmainen, Rathburn and Wyss
ATTORNEYS.

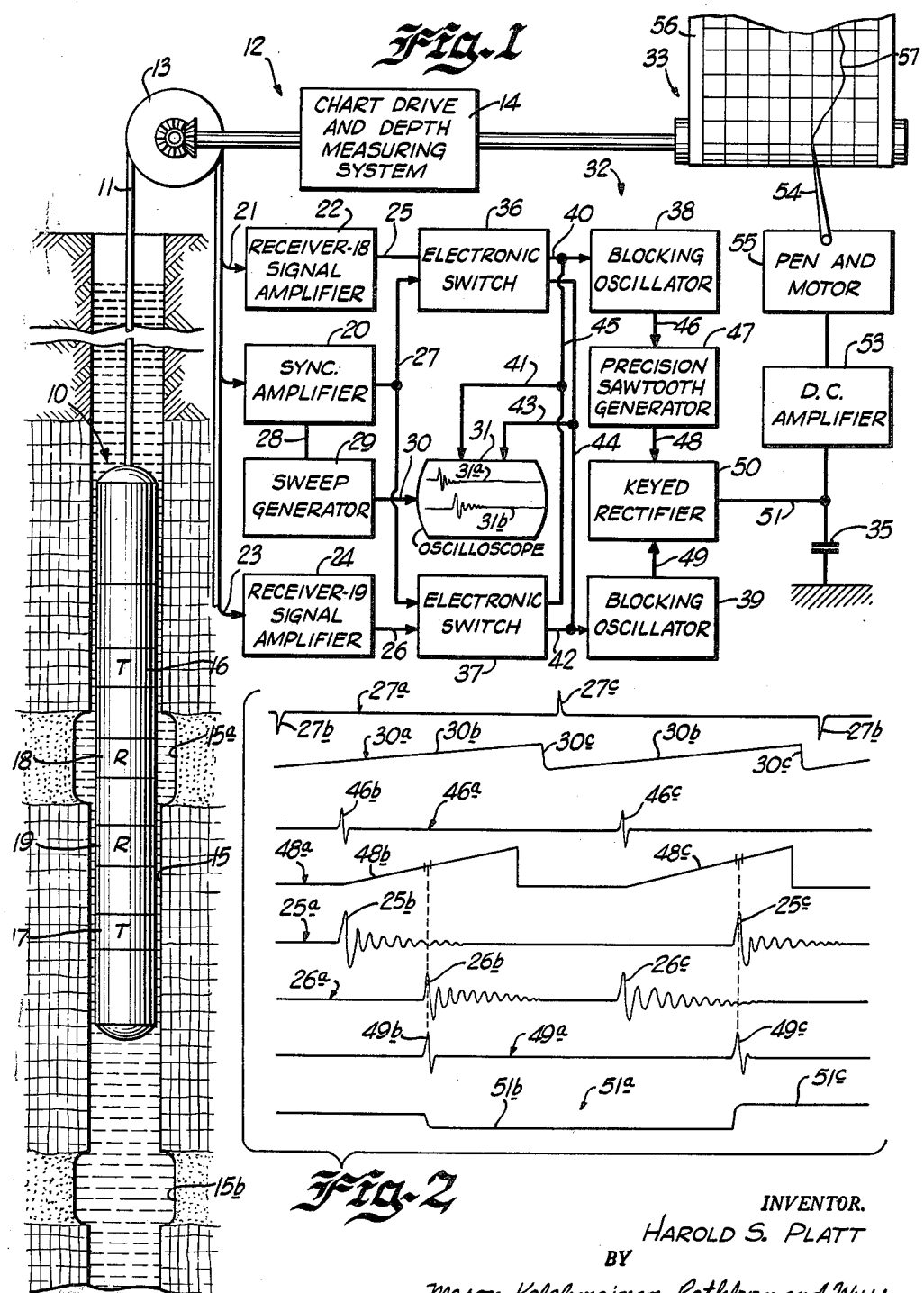

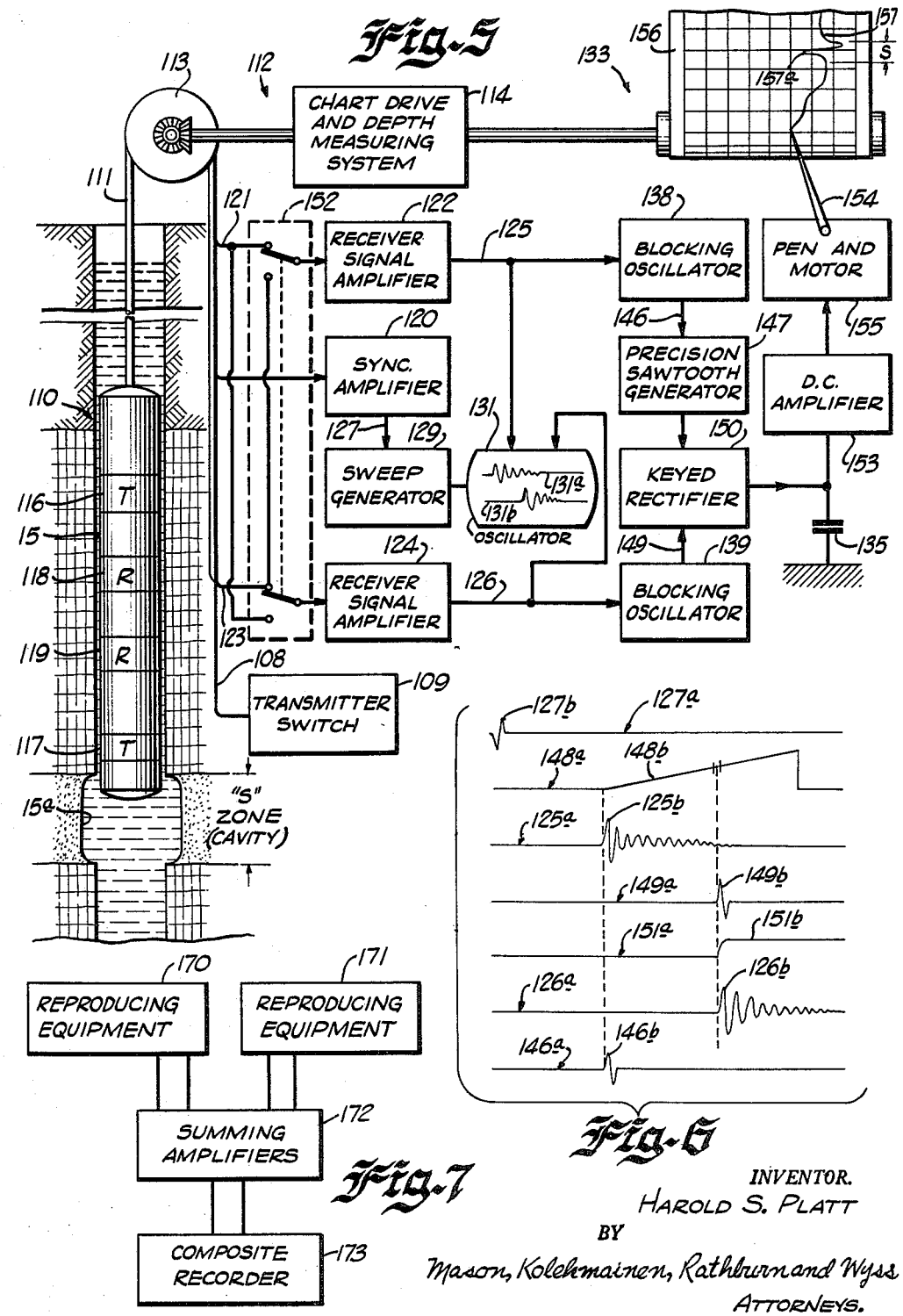

United States Patent Office 3,081,838
Patented Mar. 19, 1963

3,081,838
METHOD AND APPARATUS FOR MINIMIZING CAVITY EFFECTS IN ACOUSTIC LOGGING
Harold S. Platt, Tulsa, Okla., assignor to Seismograph Service Corporation, Tulsa, Okla., a corporation of Delaware
Filed Sept. 11, 1959, Ser. No. 839,404
6 Claims. (Cl. 181—.5)

This invention relates generally to a new and improved apparatus for measuring the velocity of propagation of elastic impulses through earth formations surrounding a well bore and is more particularly concerned with apparatus for substantially eliminating from such measurements errors arising from variations in the diameter of the borehole.

Information concerning the acoustic properties of subsurface formations is extremely vaulable to geologists and geophysicists, particularly those involved in the search for petroleum, since this information is often useful in determining the porosity, permeability and fluid content of the formations. A number of arrangements have been proposed for obtaining this information and, among these, are systems of the type disclosed in United States Patent Reissue No. 24,446 to Gerald C. Summers. In one system disclosed in the latter patent a single transmitter or source of acoustic energy is pulsed at spaced apart intervals to supply impulses which travel through the borehole fluid to the earth formations and then pass back through the borehole fluid to a single receiver spaced a fixed distance from the transmitter. At the surface a measurement is made of the time required for the impulse to travel from the transmitter to the receiver and this measurement is, of course, used to indicate the velocity of propagation of the elastic waves through those formations located between the transmitter and receiver. As indicated above, the time measurements include not only the travel time of the impulses through the formations being logged but, in addition, they are encumbered by the travel times involved in passage of the impulses through the borehole fluid both in flowing from the transmitter to the formations and in passing from the formations to the receiver. To compensate for the borehole fluid travel time, the total time measurements are usually corrected by assuming a time delay based upon the geometry of the logging tool and the borehole and the assumed velocity of the impulses in the borehole fluid and the mud-cake formed on the borehole walls. This delay is then subtracted from the total time measurements by any suitable mechanism to provide a curve which is intended to depict formation travel times only. Such a curve becomes unreliable in areas where the subsurface formations consist of thin beds since in these areas the impulses are passing through more than one type of formation and the curve, therefore, represents a composite of the travel times through different formations rather than the travel time through a single type formation. Moreover, the curves remain valid only if the logging tool is centered within the borehole, an end which can be achieved only by the addition of expensive and complex centering mechanism. Such curves are also unreliable in areas where the borehole has numerous cavities or non-uniformities in diameter, since these cavities cause the actual delay of impulses traveling through the borehole fluid to vary from the assumed or calculated delay.

It has long been recognized that a system employing a single transmitter and two receivers avoids some of the disadvantages discussed above since such systems avoid the necessity for assuming or calculating the time spent by the acoustic energy in the borehole fluid. In systems of this type a measurement is made of the travel time of the impulses from the transmitter to both receivers and the two measurements are then subtracted to obtain a signal for recording to produce the log or curve, with the recorded signal representing the time spent by the impulses in traveling through the formations located between the two receivers. Since both measurements include the travel times of the impulses through the borehole fluid, it is evident that such travel times do not appear in the final log or curve assuming, of course, that they affect both measurements equally. However, when the tool passes through a cavitated region of the borehole the borehole fluid times spent by the impulses in reaching the two receivers are no longer equal and, as a result, the final curve or log is affected by the production of an error signal which may be referred to as an "S curve" due to its shape. More specifically, when a borehole tool of normal configuration, that is, with the transmitter located above the two receivers, is moved upwards in a borehole as is customary in logging a well, the transmitting and receiving elements sequentially pass through a cavity or enlarged diameter section. Thus, the transmitter, the near receiver, and the far receiver enter and leave the cavity in that order. The presence of the cavity does not affect the accuracy of the log when only the transmitter is within the zone of increased hole diameter as the extra time required for the impulses to pass through the relative wide region of borehole fluid affects both receiver signal arrival times equally so that their difference is still related only to the true formation velocity. However, when the near receiver enters the cavity at a time when the far receiver is still disposed within the relatively smaller uniform diameter section of borehole, the signal time travel for the near receiver increases relative to that for the far receiver by the extra amount of time required for the impulses to pass through the wider region of borehole fluid. Thus, the curve or log being produced departs from its previous position where true formation velocity was being indicated and falsely indicates high-velocity due to the time difference in signal arrival at the two receivers being reduced. As the tool progresses to where both receivers are in the cavity (if the cavity is long enough), the curve or log will swing back to indicate true formation velocity, as long as both receivers are within the cavitated region. As the near receiver emerges from the cavity, leaving only the far receiver therein, the curve or log will again depart from its position indicating true velocity. However, this time its departure will be in the direction indicating a false low-velocity due to the increased time difference between the two receivers caused by the extra time travel required for the impulses to reach the far receiver through the relatively wider region of borehole fluid. Finally, as the far receiver emerges from the cavity, the curve or log again indicates the true velocity of the formation adjacent the receivers. The error signal described thus appears twice per cavity and results in production of an S-shaped error curve which obscures the true formation velocity over a log length equal to the receiver spacing. The magnitude of the departures from true velocity is directly related to the relative increase in borehole diameter and the two points of maximum error are separated on the curve or log by a length equal to that of the cavity if the cavity length is either equal to or greater than the receiver spacing. While in certain cases, particularly where cavities are very small and/or occur infrequently, the S-shaped error signals can be detected and taken into account during the analysis, in other instances where the borehole contains numerous large cavities and/or other zones of abrupt variation in diameter, these error signals are difficult to recognize and may lead to a false interpretation of the graph. The error signals are often distinguishable when the spacings between the transmitter and the receivers are relatively large, i.e., when the near receiver is located about three feet from the transmitter and the far receiver is spaced about three feet from the near receiver or when the near receiver is located about six feet from the transmitter and the far receiver is three feet from the near receiver, spacings commonly employed in many present day logging procedures. However, efforts to move the receivers closer together to obtain a higher resolution log in accordance with the latest logging techniques, result in accentuation of the "S curve" error signal problem both by increasing the amplitude and the number of such signals. It would, of course, be desirable to provide a logging arrangement wherein the problem of "S curve" errors is either eliminated or greatly reduced and the satisfaction of this desire, therefore, constitutes the principal object of the present invention.

Another object of the present invention is to provide a logging system for eliminating the "S curve" errors described above without at the same time unduly complicating the equipment employed.

The foregoing and other objects are realized in accordance with the present invention, by the provision of a velocity well logging system employing a pair of spaced apart transmitters for supplying impulses at different times to the earth formations for reception at a pair of spaced apart receivers. The transmitters and receivers are connected via a cable to surface equipment which includes, in addition to the usual means for raising and lowering the logging tool, means for measuring the time intervals between the transmission of impulses from each transmitter and the reception of these impulses at each receiver. In the surface equipment the difference in travel times of the impulses from one transmitter to the two receivers is determined together with the difference in travel times of the impulses from the other transmitter to the two receivers. The two differences are then averaged to provide a single curve or log which is free of the aforementioned "S curve" problems, and also possesses the usual advantages inherent in two-receiver acoustic logging systems since the log need not be corrected for the travel times of the impulses in the borehole fluid.

In one form of the invention the two transmitters are operated alternately as the logging tool moves through the borehole and the surface equipment is switched in synchronism with the alternate transmission of impulses from these two transmitters. Thus, when a first of the two transmitters is rendered operative, the surface equipment is conditioned to measure the difference in travel times of the impulses from the first transmitter to the two receivers. When, on the other hand, the second of the transmitters is operating the surface equipment is conditioned to measure the difference in travel times of the impulses from the second transmitter to the two receivers. The surface equipment includes a relatively high inertia recording pen and motor which is supplied with the difference signals measured during both intervals of operation but, since the alternate operation of the transmitters occurs at such a rapid rate, the recording pen and motor is incapable of responding instantaneously to changes and, as a consequence, it averages the different signals. The average value of the difference signals is substantially free of the aforementioned "S curve" errors since the switching action causes a cavity or the like in the borehole to hvae an opposite effect upon the two difference signals. Thus, if a cavity falsely varies one of the difference signals in the high velocity direction, it will vary the other difference signal in the low velocity direction and, hence, the average of the two difference signals is substantially free from the effects of the cavity.

In accordance with a second form of the invention, the "S curve" errors are eliminated by making two runs of the logging tool through the borehole, by obtaining a curve or graph during each run, and by compositing the two curves thus obtained. The first transmitter remains operative throughout the first run to transmit impulses at spaced apart intervals through the earth formations to the two receivers. The second transmitter remains inoperative throughout the first run. A curve is recorded showing the difference in travel times of the impulses from the first transmitter to the two receivers as a function of borehole depth. During the second run, the first transmitter remains inoperative and the second transmitter is rendered effective to transmit impulses at spaced apart intervals to the two receivers. A second curve is recorded depicting the difference in travel times of the impulses from the second transmitter to the two receivers as a function of borehole depth. The curves are preferably of the reproducible type so that they may be played back simultaneously to permit the signals reproduced from the two records to be added together or composited. The composited signal is then re-recorded to provide a single curve or graph which, as will be evident from the foregoing discussion, is free from "S curve" errors.

The invention, both as to its organization and method of operation, together with further objects and advantages thereof, will best be understood by reference to the following detailed description taken in conjunction with the accompanying drawings wherein:

FIG. 1 diagrammatically and schematically illustrates a velocity well logging system characterized by the features of the present invention with a fragmentary portion of the earth's surface being shown having a borehole extending therethrough, the downhole tool of the system being illustrated in position within the borehole;

FIG. 2 depicts a number of typical waveforms which might exist at various points in the system shown in FIG. 1;

FIG. 5 is a view similar to FIG. 1 but diagrammatically and schematically illustraates an alternative arrangement of the velocity well logging system of the present invention with the downhole tool again being illustrated within a borehole extending through a fragmentary section of the earth's surface.

FIG. 6 depicts a number of typical waveforms which might exist at various points in the system shown in FIG. 5; and FIG. 7 diagrammatically and schematically illustrates reproducing and compositing equipment for use with records produced from the system shown in FIG. 5.

Figure 4:
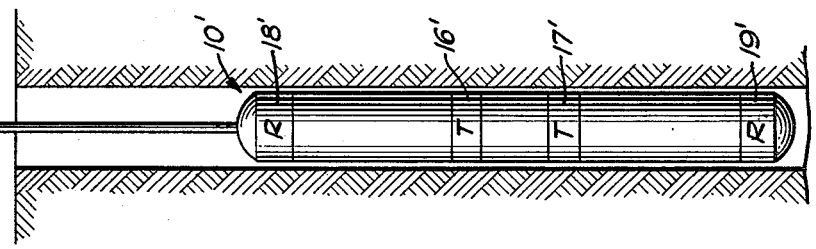
FIG. 4 illustrates a fragmentary section of the earth's surface containing a borehole within which is disposed an alternative arrangement of the downhole tool which may be used in a system of the type shown in FIG. 1.

Referring now to the drawings and first to FIG. 1 a well logging system according to the present invention is there illustrated as including a downhole or logging tool 10 connected via a multi-conductor cable 11 to surface equipment indicated generally by the reference numeral 12. At the surface the cable 11 is trained over a sheave 13 or the like which is driven from a suitable drive mechanism 14 to raise or lower the logging tool within a borehole 15. The borehole, which may include relatively uniform diameter portions and one or more cavities 15a, 15b, etc., is bounded by earth formations formed of various strata having velocity characteristics to be determined or measured by the logging system. The borehole may, of course, be partially or substantially filled with drilling fluid as is conventional in this art and its walls may be covered with a layer of mudtime interval between the pulses 25c and 26c. This alternate charging of the capacitor 35 is accomplished through a circuit including a pair of electronic switches 36 and 37 which function to control the application of signals from the amplifiers 22 and 24 to the vertical deflection plates of the cathode ray oscilloscope 31 and to a pair of pulse generators 38 and 39. The latter pulse generators preferably take the form of blocking oscillators of conventional construction for developing sharp pulses coinciding with the arrival of impulses at the receivers. The switches 36 and 37 synchronize the operation of the surface equipment 12 with the alternate operation of the transmitters 16 and 17 so that during the first interval of operation the output of the amplifier 22 is applied to the blocking oscillator 38 and the output of the amplifier 24 is applied to the blocking oscillator 39 while, during the second interval of operation the connections are reversed with the result that the output of the amplifier 22 passes to the blocking oscillator 39 and the output of the amplifier 24 is applied to the blocking oscillator 38. More specifically, each of the switches 36 and 37 preferably includes a gate circuit in the form of a triggered bistable multivibrator which is not shown since it is of conventional construction. The gate circuit in the switch 36 responds to the negative pulses 27b to develop a unidirectional control signal or rectangularly shaped wave which is terminated or cut off by the arrival of the positive pulse 27c. Thus, throughout the first interval of operation, the gate circuit in the switch 36 develops a unidirectional signal for operating a switch in the form of a relay or the like in order to connect the signal conductor 25 with a connector 40 leading to the blocking oscillator 38. During this first interval the signals from the amplifier 22 are supplied via conductor 41 to the set of vertical deflection plates for controlling one of the beams of the oscilloscope 31. This beam is thus deflected to produce a trace of the type indicated at 31a in FIG. 1.

The gate circuit in the switch 37, on the other hand, may be said to be the inverse of the gate circuit in the switch 36 since it is cut off by the negative pulses 27b and is triggered or operated by the positive pulses 27c. Thus, during the first interval of operation the gate circuit in the switch 37 generates no control signal and under these conditions its associated switch or relay is effective to connect the conductor 26 to a signal connector 42 leading to the blocking oscillator 39. This signal is applied through conductor 43 to the other set of vertical deflection plates of the oscilloscope, thereby deflecting the second beam to develop a trace like that shown at 31b in FIG. 1. At the termination of the first interval of operation, the gate circuit in the switch 36 is cut off by the positive pulse 27c so that it no longer develops its unidirectional control signal while the gate circuit in the switch 37 is rendered operative by the pulse 27c and, hence, becomes effective to develop a square wave signal for operating its associated relay or switch. Thus, during the second interval of operation, the switch or relay in the switch circuit 36 reverts to its normally closed condition to connect the conductor 25 to a signal connector 44 leading to the blocking oscillator 39 and also to connect the conductor 25 through the connector 43 to the second set of vertical deflection plates of the oscilloscope 31. Throughout the second interval, the control signal developed by the gate circuit in the switch 37 maintains its associated switch or relay operative to connect the conductor 26 through a connector 45 to the blocking oscillator 38 and also to connect the conductor to the first set of vertical deflection plates of the oscilloscope through the conductor 41.

During the first interval of operation, the blocking oscillator 38 is triggered by the pulse 25b and, as a result, it develops a sharp output pulse as indicated at 46b on the waveform 46a shown in FIG. 2. The output signal from the blocking oscillator 38 appears on connector 46 and, of course, has the appearance of the wave 46a. This output signal is applied to a very linear precision sawtooth generator 47 preferably of the type described in the above-identified Summers patent and it develops a sawtooth wave appearing on its output conductor 48 which wave has an appearance corresponding to the wave 48a shown in FIG. 2. Thus, the output of the precision sawtooth generator 47 includes a sawtooth portion 48b generated initially by the pulse 46b from the blocking oscillator 38. The sawtooth portion 48b rises very linearly from its starting point and continues to rise for a fixed period which is determined by the component elements of the circuit. The sawtooth portion 48b is sampled at the instant of occurrence of the pulse from the blocking oscillator 39. To this end, the blocking oscillator 39 develops upon its output conductor 49 a pulsed wave having the appearance of the waveform 49a shown in FIG. 2. This wave includes a pulse 49b which is developed coincidentally with the arrival of the impulse from transmitter 16 at the receiver 19. The output of the blocking oscillator 39 is applied to a switch circuit or keyed rectifier 50 which responds to the pulse 49b by connecting the output of the sawtooth generator 47 to charge the storage capacitor 35 to a voltage equal to the magnitude of the sawtooth wave 48b at the instant of occurrence of the pulse 49b. Since the sawtooth wave 48b increases linearly with time, the magnitude of the voltage applied to the capacitor 35 is directly proportional to the time interval between the pulses 46b and 49b and, hence, to the time interval between the arrival of the impulse from transmitter 16 at the receiver 18 and the arrival of this impulse at the receiver 19. The sawtooth wave portion 48b continues to rise following the sampling until the time period of the generator 47 expires. The components of the sawtooth generator 47 are selected so that the sawtooth portion 48b has a length greater than the maximum interval between pulses 46b or 49b even in the slowest velocity formations encountered. At the same time, the sawtooth portion 48b is shorter than the minimum time between the start of the sawtooth and the initiation of the succeeding transmitter pulse at the beginning of the next interval of operation.

The second interval of operation, as described above, begins with the transmission of an impulse from the transmitter 17 and coincidentally therewith the production of the pulse 27c at the output of the sync amplifier 20. The pulse 27c changes the conditions of the switches 36 and 37 in the manner previously described so that the impulses arriving at the receiver 19 are applied through the amplifier 24 and through the switch 37 to the blocking oscillator 38. The pulse 26c triggers the blocking oscillator 38 so that the latter develops a pulse 46c coincident with arrival of the impulse from the transmitter 17 at the receiver 19. The latter pulse 46c starts the precision sawtooth generator 47 whereupon the latter begins to develop the linearly rising sawtooth 48c shown on the waveform 48a.

During the second interval of operation, the output of the amplifier 22 is connected through the switch 36 to the blocking oscillator 39 and, as a result, the arrival of the impulse from the transmitter 17 at the receiver 18, an event indicated by the pulse 25c at the output of the amplifier 22, is accompanied by the generation of a pulse 49c by the blocking oscillator 39. The pulse 49c again actuates the keyed rectifier circuit 50 to charge the storage capacitor to a value corresponding to the amplitude of the sawtooth 48c at the instant of the pulse 49c. Since the sawtooth 48c rises linearly with respect to time, the capacitor 35 is charged to a value which is directly proportional to the time lapse between the pulses 46c and 49c and also to the time difference between the arrival of the impulse from the transmitter 17 at the receiver 18 and the arrival of this impulse at the receiver 19.

cake particularly in areas located adjacent permeable formations.

The downhole tool 10 includes a pair of vertically spaced apart transmitters 16 and 17 for supplying impulses or acoustic energy at different times through the borehole fluid and through the earth formations to a pair of spaced apart receivers 18 and 19. The transmitters and receivers are located in fixed positions upon the tool 10 and, in the form of the invention shown in FIG. 1, the transmitters 16 and 17 are respectively disposed above and below the two receivers although, as will be described hereinafter in conjunction with the description of the downhole tool illustrated in FIG. 4, the two transmitters may also be oriented vertically between the two receivers. Each of the transmitters 16 and 17 may be of the type described in detail in the above-identified patent Reissue No. 24,446 to Summers so that it operates to send out impulses at spaced apart intervals. These transmitters may be pulsed either from the surface or from a suitable source in the downhole equipment and, in the form of the invention shown in FIG. 1, they are pulsed alternately. The interval between the pulsing of transmitter 16 and the pulsing of transmitter 17 is longer than the time required for the acoustic energy to travel from the transmitter 16 to the receiver 19 even in the lowest velocity formations encountered in logging the borehole. Thus, the impulse from transmitter 16 has sufficient time to reach both of the receivers 18 and 19 before the second transmitter 17 is pulsed. In similar manner, the time interval between the pulsing of transmitter 17 and the pulsing of transmitter 16 is somewhat longer than the time required for impulses from the transmitter 17 to reach the receiver 18 even in the lowest velocity formations.

Pulses generated simultaneously with the pulsing of transmitters 16 and 17 are applied to a sync amplifier 20 in the surface equipment to correlate the operation of the recording and indicating circuits of the latter equipment with the alternate operation of the downhole transmitters. The surface equipment 12 measures accurately the time intervals between the sync pulse coinciding with the generation of an impulse by the transmitters and other pulses coinciding with the arrival of the impulses at the receivers. More specifically, the surface equipment functions during the first interval of operation; that is during the period immediately succeeding the generation of an impulse by the transmitter 16; to measure the difference in times between the arrival of this impulse at the receiver 19 and its arrival at the receiver 18. During the second interval of operation; that is, during the period immediately succeeding the generation of an impulse by the transmitter 17; the surface equipment measures the time difference between the arrival of the latter impulse at the receiver 18 and its arrival at the receiver 19. The indicating portion of the surface equipment then responds to an average of these two time differences to provide a single curve or log.

More specifically, the signals arriving at the receiver 18 during both periods of operation are supplied through a cable conductor 21 to a signal amplifier 22 in the surface equipment while the signals arriving at the receiver 19 during both intervals are applied via a cable conductor 23 to a signal amplifier 24. The amplifiers 22 and 24 are of conventional construction and they develop at their output terminals 25 and 26 waveforms which may have the appearance of those indicated at 25a and 26a, respectively, in FIG. 2. More specifically, during the first interval of operation, the receiver 18 detects the impulse from the transmitter 16, the initial arrival of this impulse being depicted at 25b in FIG. 2. During this same interval of operation, but sometime after the pulse 25b occurs, the receiver 19 detects the impulse from the transmitter 16 as is indicated at 26b. The time interval between the pulses 26b and 25b is, of course, representative of the travel time of the impulse through the earth formations located between the two receivers assuming, of course, that the borehole is of uniform diameter and that the tool 10 remains centered within the borehole throughout the measuring operation. In similar manner, during the second interval of operation, the receiver 19 detects the impulse from the transmitter 17, as indicated at 26c, and soon thereafter the receiver 18 detects the impulse from the transmitter 17, an event which is indicated by reference numeral 25c in FIG. 2. The sync pulses applied to the amplifier 20, which is of conventional construction, are amplified to develop at its output 27 a signal having the appearance of the waveforms 27a shown in FIG. 2. The output of the amplifier 20 thus includes pulses 27b each coinciding with the generation of an impulse by the transmitter 16 and pulses 27c each coinciding with the generation of an impulse by the transmitter 17. The pulses 27b and 27c are of opposite polarity, an effect which can be achieved by use of a phase inverter in the signal supply circuit from one of the transmitters. Since the output of the transmitters 16 and 17 are damped oscillations having both positive and negative portions, these outputs are rectified prior to application to the amplifier 20 for the purpose of developing the negative and positive spikes 27b and 27c shown in FIG. 2.

To permit the operator at the surface to monitor the operation of the system, means are provided for visually inspecting the signals arriving at the receivers 18 and 19 or at least the important parts of these signals. In addition, relatively narrow "marker pip" pulses developed as described hereinafter are superimposed upon the receiver signals at positions coinciding with the initial arrival of the pulses of the receivers. To provide a signal for triggering the monitor, the amplifier 20 develops a second output appearing upon signal conductor 28 and having the appearance of the waveform 27 discussed above. The latter output is applied to a sawtooth sweep generator 29 which functions in conventional manner to develop a sawtooth wave for application via connector 30 to the horizontal deflection plates of a dual beam cathode ray oscilloscope 31. The signal developed by the sweep generator 29 has the appearance of the waveform 30a shown in FIG. 2 and includes a linearly rising or sawtooth portion 30b initiated simultaneously with the sync pulse 27b. This sawtooth 30b simultaneously deflects or sweeps the two beams of the cathode ray oscilloscope 31 from left to right, as viewed in FIG. 1, to develop upon the screen of the oscilloscope an upper trace indicated by the reference numeral 31a and a lower trace indicated by the reference numeral 31b. As will be described more fully hereinafter, during the course of the sweep the vertical deflection plates for the two electron beams are independently supplied with signals from the amplifiers 22 and 24 and with the "pip marker" pulses referred to above. The components making up the timing circuit of the sweep generator 29 are so selected that the overall length of the sawtooth 30b may be varied to permit all or any desired portion of the outputs of the amplifiers 22 and 24 to be depicted upon the screen of the oscilloscope. The sharply falling trailing edge 30c of the sawtooth 30b is effective to return the two beams to the cathode ray oscilloscope to the left at the completion of their sweeps.

As was indicated previously, the surface equipment 12 includes measuring apparatus indicated generally by the reference numeral 32 for measuring the time difference between the pulses 25b and 26b and for measuring the time difference between the pulses 25c and 26c. The surface equipment further includes a recording instrument 33 responsive to the average of these two time differences. The measuring apparatus includes a capacitor 35 that is charged during the first interval of operation to a voltage proportional to the time interval between the pulses 25b and 26b and during the second interval of operation is charged to a voltage proportional to the The D.C. signal applied to the storage capacitor 35 appears upon a connector 51 and is represented by waveform 51a shown in FIG. 2. Following generation of pulse 49b by the blocking oscillator 39 during the first interval of operation, the capacitor 35 is charged to a D.C. voltage having an amplitude indicated at 51b in FIG. 2. The capacitor 35 remains charged at this level until the generation of the pulse 49c by the blocking oscillator 39 during the second interval of operation, an event which, as indicated above, changes the charge on the capacitor 35 to the level indicated at 51c in FIG. 2. The capacitor 35 obviously remains charged to the latter level until the generation of the pulse 49b during the succeeding interval of operation.

The charge on the storage capacitor 35 provides a D.C. signal for application through a conventional D.C. amplifier 53 to the drive motor for the recording instrument 33. The latter instrument preferably includes a recording pen or stylus 54 driven by a suitable motor 55. The pen or stylus 54 engages a chart or record 56 which, in accordance with the usual well logging practice, is driven from the mechanism 14 so that the chart movement is directly proportional to the movement of the logging tool 10 within the borehole. Thus, the pen 54 occupies a position lengthwise of the record 56 corresponding to the depth of the tool 10 in the borehole. The pen 54 is deflected laterally of the record 56 to develop a curve 57 representing the velocity of propagation of the earth formations existing at each borehole depth, this deflection being accomplished by the drive motor 55 in response to the D.C. signals appearing across the storage capacitor 35. Since the motor 55 cannot respond instantaneously to a change in level of the signal appearing across the capacitor 35, the pen 54 does not change position as the signal from the rectifier 50 changes from the level 51b to the level 51c. Instead, the pen is moved in response to an average value of the charge on capacitor 35 taken over several intervals of operation. This is an important factor in the elimination of the "S curve" errors referred to above.

Figure 3:
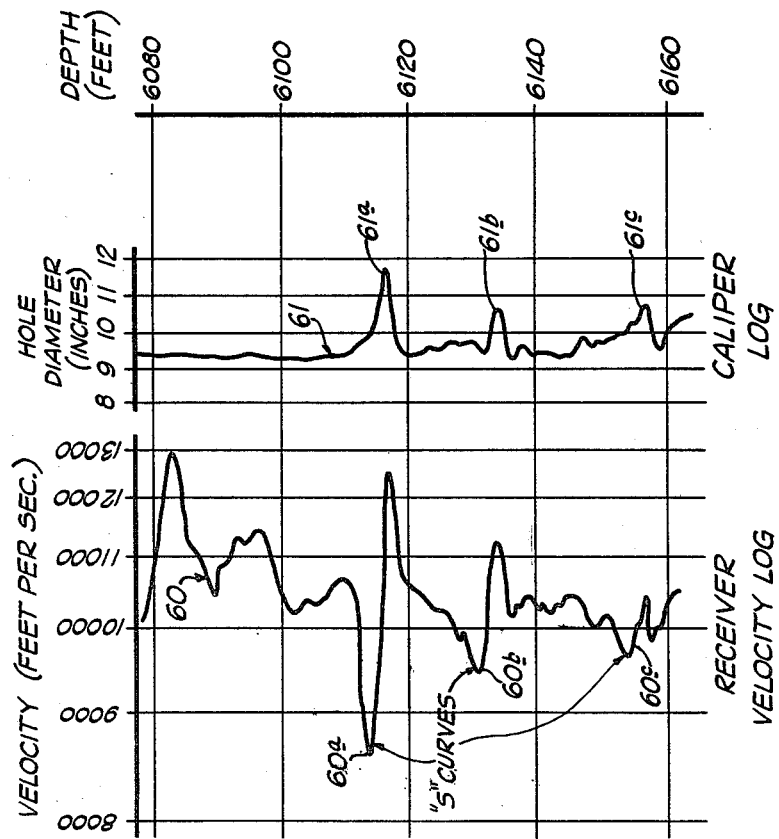
FIG. 3 illustrates a typical velocity curve and a typical caliper log produced by systems of the prior art and shows particularly the "S curve" errors produced by abrupt changes in borehole diameter.

For a better understanding of the cause and effect of the "S curve" errors reference is next made to FIG. 3 which depicts a section of a typical velocity curve 60 made in a portion of a borehole and arranged alongside a caliper curve 61 made in the same borehole portion. The velocity curve 60 was made by use of logging apparatus including two receivers and a single transmitter but this apparatus did not include the "S curve" eliminating feature of the present invention. As will be observed from the curve 61, the borehole region under investigation contains three cavities or abruptly varying portions respectively indicated at 61a, 61b and 61c on the curve. The velocity curve shows three "S curve" errors 60a, 60b, 60c respectively aligned with the caliper curve portions 61a, 61b, 61c. As was described more fully above each of the "S curve" errors 60a, 60b and 60c is caused by movement of the logging apparatus through a cavitated region of the borehole where the velocity curve is deflected to indicate falsely a high velocity zone and a low velocity zone where no such zones actually exist. As was previously described, such errors arise when a borehole tool of normal configuration (one in which the transmitter is disposed above the two receivers) is raised within the borehole during logging. When the transmitter is located within a cavity and both receivers are disposed within normal borehole regions, the curve indicates true velocity since the signals reaching both receivers are delayed by equal amounts and the time difference between the arrivals is therefore unaffected by the cavity. When the near receiver enters the cavity and the far receiver is located within a borehole area of normal diameter the signal to the near receiver is delayed and the velocity curve falsely indicates a high velocity. When the far receiver, i.e., the receiver most distant from the transmitter, enters the cavity with the transmitter and the near receiver located in uniform diameter portions of the borehole, the signal to the far receiver is delayed by an amount corresponding to the extra travel time involved in passing through the borehole fluid in the cavitated region. Under these conditions, the velocity curve 60 falsely indicates a low velocity thus completing the creation of one of the "S curve" errors. As will be observed from FIG. 3, these errors are often indistinguishable from the varying velocity portions of the curve 60 and, as a result, they severely complicate the analysis of the record.

The arrangement illustrated in FIG. 1 and described above eliminates the "S curve" errors by effectively recording at each borehole depth a value representing the average of the travel time of the impulse from the transmitter 16 through the formations between the receivers 18 and 19 and the travel time of the impulse from the transmitter 17 through these formations. Since the tool 10 is moved through the borehole at relatively slow speed in making the log, these travel times do not occur through exactly the same formations but since the transmitters 16 and 17 are pulsed at a relatively high rate, i.e., about 20 cycles per second, for example, the tool moves very little in the interval between the impulses and, hence, for all practical purposes successive impulses from the transmitters 16 and 17 traverse a common portion of the earth formations between the two receivers.

To facilitate an understanding of the manner in which the "S curve" errors are eliminated by the system shown in FIG. 1, it will be assumed that the borehole 15 is being logged by raising the tool 10 from the position shown in FIG. 1 although it should be clearly understood that the logging may also be carried out by lowering the tool within the borehole. When the tool is in the position shown in FIG. 1 the receiver 18 is disposed within the cavitated region 15a and the transmitters 16 and 17 and the receiver 19 are all located within uniform diameter portions of the borehole. Thus, the impulse arriving at the receiver 18 is delayed by the increased time required for the impulse from transmitter 16 to travel through the borehole fluid in the cavity 15a. This means that the pulse 25b, the pulse 46b and the start of the sawtooth wave portion 48b are all delayed somewhat and as a result the D.C. voltage applied to the capacitor 35 upon the generation of the pulse 49b is less than that which would be developed in the absence of the cavity by an amount which is directly proportional to the increased travel time of the impulse through the borehole fluid or to the diameter of the borehole 15 in the region of the cavity 15a. The pulse 26b and the pulse 49b are not delayed, of course, since the impulse from the transmitter 16 reaches the receiver 19 without passing through the excess borehole fluid in the cavity 15a. During the second interval of operation, the impulse from transmitter 17 passes to the near receiver 19 without passing through the borehole fluid in the cavity 15a and, as a consequence, neither the pulse 26c, nor the pulse 46c, nor the start of the sawtooth 48c are delayed. However, the impulse arriving at the receiver 18 from the transmitter 17 is again delayed by the increased travel time required to pass through the borehole fluid in the cavity 15a with the result that the pulse 25c and the pulse 49c are delayed by a corresponding amount. Thus, the voltage from the sawtooth 48c applied to the capacitor 35 when the pulse 49c is generated reaches a level exceeding that which would be developed in the absence of the cavity 15a by an amount directly proportional to the borehole diameter in the region of the cavity 15a or, more specifically, to the increase in travel time required for the impulse from transmitter 17 to pass through the borehole fluid in the cavity. Since the voltage increase across the capacitor 17 caused by the cavity during the second interval of operation is approximately equal to the decrease occurring during the first interval as a result of the cavity, these variations are effectively offset or cancelled by the recording instrument 33 which, as described above, responds only to the average value of the D.C. voltages applied across the capacitor 35. Thus, the curve 57 recorded by the instrument 33 is substantially free from the effects of variation in diameter of the borehole and does not contain the "S curve" errors inherent in prior velocity logging systems.

In view of the foregoing description, it will be observed that the travel time or velocity recorded at each depth on the graph or curve 57 is actually:

$$\frac{T_{16}R_{19} - T_{16}R_{18} + T_{17}R_{18} - T_{17}R_{19}}{2}$$

Where $T_{16}R_{19}$ represents the travel time of the impulse from the transmitter 16 to the receiver 19 during the first interval of operation, $T_{16}R_{18}$ represents the travel time of the impulse from the transmitter 16 to the receiver 18 during this first interval, $T_{17}R_{18}$ represents the travel time of the impulse from the transmitter 17 to the receiver 18 during the second interval of operation and $T_{17}R_{19}$ represents the travel time of the impulse from the transmitter 17 to the receiver 19 during the latter interval.

While the transmitters 16 and 17 are illustrated in FIG. 1 as being disposed respectively above and below the receivers 18 and 19, the arrangement shown in FIG. 4 may also be employed. Thus, the downhole tool, which in FIG. 4 has been assigned reference numeral 10′, includes a pair of receivers 18′ and 19′ respectively located above and below a pair of alternately operated, vertically spaced transmitters 16′ and 17′. The tool 10′ is used in a system exactly like that shown in FIG. 1 and, hence, the remaining components have not been illustrated. Thus, the receivers 18′ and 19′ supply them detected signals to amplifiers 22 and 24, sync pulses from the transmitters 16′ and 17′ are supplied to the sync amplifier and so on. The measuring apparatus in the surface equipment functions during the first interval of operation when the impulse from the transmitter 16′ is traveling through the earth formations to provide a first signal, i.e. a signal similar to the sawtooth 48b shown in FIG. 2, representing the difference between the travel times of the latter impulse to the two receivers 18′ and 19′. The manner in which this first signal is obtained will be obvious from the foregoing description.

During the second interval of operation when the impulse from transmitter 17′ is traveling through the earth formations, the surface equipment develops a second signal, i.e. a signal similar to the sawtooth 48c shown in FIG. 2, representing the difference in travel times of the impulse from transmitter 17′ to the two receivers 18′ and 19′. The recording instrument in the surface equipment responds in the manner previously described to the average value of the first and second difference signals to develop a velocity curve, which is again free from "S curve" errors as will be evident from the foregoing discussion. The signal recorded at each borehole depth, therefore, corresponds to the following:

$$\frac{T_{16'}R_{19'} - T_{16'}R_{18'} + T_{17'}R_{18'} - T_{17'}R_{19'}}{2}$$

Where $T_{16'}R_{19'}$ represents the travel time of this impulse from the transmitter 16′ to the receiver 19′ during the first interval of operation, $T_{16'}R_{18'}$ represents the travel time of this impulse to the receiver 18′ during the same interval, $T_{17'}R_{18'}$ represents the travel time of the impulse from the transmitter 17′ to the receiver 18′ during the second interval of operation, and $T_{17'}R_{19'}$ represents the travel time of the latter impulse to the receiver 19′ during the second interval.

Another arrangement for producing a velocity curve free from "S curve" errors is illustrated in FIGS. 5, 6 and 7 where a downhole logging tool 110 is shown positioned within the borehole 15. The tool carries a pair of spaced apart transmitters 116 and 117 acoustically isolated from a pair of spaced apart receivers 118 and 119. While the transmitters are illustrated as being respectively located above and below the receivers, it should be understood that an arrangement like that shown in FIG. 4 may also be employed. The tool 110 is again connected via a cable 111 to surface equipment 112 which includes a sheave 113 and a drive mechanism 114 cooperating with the cable to raise and lower the tool within the borehole. In operation of the system shown in FIG. 5, the borehole is actually logged twice during two different runs or passes of the tool 110 therethrough, one such log being made with the transmitter 116 operating and the other log being made with the transmitter 117 operating. A velocity log is made during each run and the two logs thus obtained are added together or composited by the apparatus shown in FIG. 7 to develop a single curve. To this end the surface equipment 112 includes a transmitter selector switch 109 which is used to render transmitters 116 and 117 operative one at a time by means of momentary pulsing of a suitable borehole tool-contained solenoid type step switch, relay, or the like. A second related switch 152 provides means for correctly coupling the near and far receiver signals to the appropriate surface amplifiers, 122 and 124 respectively, in either mode of operation. Thus, during the production of a first of the two logs referred to above, switch 109 is utilized to render the transmitter 116 operative throughout the run to supply impulses at spaced apart intervals through the borehole formations to both of the receivers 118 and 119. In this case receivers 118 and 119 are referred to as the near and far receiver respectively, due to their relative distance from transmitter 116. With the transmitter 116 operating the switch 152 is positioned as shown in FIG. 5 to connect the receivers 118 and 119 via cable conductors 121 and 123 to amplifiers 122 and 124, respectively. During this first run the second transmitter 117 remains inoperative. During the second run the switching circuit 109 is conditioned to render the transmitter 116 inoperative and to render the transmitter 117 effective to supply pulses at spaced apart intervals through the borehole formations to the receivers 119 and 118 in that order, due to the physical arrangement. The surface equipment mode selector switch 152 is now conditioned to affect coupling of the now near receiver 119 via conductor 123 to surface amplifier 122 and the now far receiver 118 via conductor 121 to surface amplifier 124. Thus, during each run a log is made using a single transmitter, two-receiver system although different transmitters are employed during the runs.

The surface equipment 112, except for the switching circuits 109 and 152 just described, is of the type conventionally employed in two-receiver, single transmitter systems and, hence, it will be described only briefly considering first the log produced during the first run when the transmitter 116 is operating. The signals detected by the receiver 118 are supplied through a cable conductor 121 to an amplifier 122 which produces at its output 125 a signal having the appearance of waveform 125a shown in FIG. 6. In similar manner, the signals detected by the receiver 119 are applied via a cable conductor 123 to an amplifier 124 to develop upon output connector 126 a signal having the apperance of the waveform 126a shown in FIG. 6. Pulse 125b of the waveform 125a represents the instant of arrival of the impulse from the transmitter 116 at the receiver 118 while pulse 126b of the waveform 126a represents the instant of arrival of the impulse from the transmitter 116 at the receiver 119. A sync amplifier 120 is supplied with a pulse at the instant of generation of each impulse by the transmitter 116 thus developing at its output 127 a signal having the appearance of the waveform 127a shown in FIG. 6. The latter signal includes a pulse 127b coinciding with the instant of generation of the impulse by the transmitter 116. The pulse 127b triggers a sweep generator 129 for generating a sawtooth wave which is used to sweep the beam of a monitor oscilloscope 131 from left to right as viewed in FIG. 5. The outputs of the amplifiers 123 and 124 are applied to the vertical deflection circuits of the oscilloscope to produce traces 131a and 131b like those shown in FIG. 5. The two amplifier outputs are, as in the first described system, separately coupled to independent vertical deflection plates of oscilloscope of the dual beam oscilloscope 131 so that the two signals are on separate traces spaced apart vertically on the screen of the oscilloscope in order to facilitate their interpretation by the operator at the surface, thus making possible optimum manual adjustment of controls in the time measuring circuits. The outputs of the amplifiers 122 and 124 are also respectively applied to blocking oscillators 138 and 139 which develop signals at their outputs 146 and 149, respectively, having the appearance of the waveforms 146a and 149a. The waveform 146a includes a pulse 146b generated by the blocking oscillator 138 to coincide with the pulse 125b. The pulse 146b functions in the manner previously described to trigger a precision sawtooth generator 147 so that the latter begins to develop a very linear sawtooth indicated at 148b on the waveform 148a shown in FIG. 6. The sawtooth wave portion 148b continues to rise linearly for a period determined by the time constants of the circuit. As indicated above, this period is preferably greater than the maximum time between pulses 125b and 126b even in the slowest velocity formations but, at the same time, this period is shorter than the minimum period expected between the pulse 125b and the generation of an impulse by the transmitter at the beginning of the next cycle. The sawtooth portion 148b is sampled by a pulse 149b generated by the blocking oscillator 139 and coinciding with the arrival of the pulse 126b at the receiver 119. The pulse 149b operates a keyed rectifier circuit 150 of the type described above in order to charge a storage capacitor 135 to a value corresponding to the amplitude of the sawtooth 148b at that time. Since the latter sawtooth rises linearly with respect to time, the magnitude of the D.C. signal applied to the capacitor 135 is directly proportional to the time interval between the pulses 146b and 149b and, hence, to the difference in travel times of the impulse from transmitter 116 between the two receivers 118 and 119. The D.C. signal applied from the keyed rectifier 150 to the capacitor 135 is represented by the waveform 151a shown in FIG. 6 with the level 151b of the waveform indicating the magnitude of the D.C. signal supplied when the pulse 149b is generated. The voltage appearing across the storage capacitor 135 is again applied through a D.C. amplifier 153 to the drive motor 155 of a recording instrument 133 of the type previously described. Thus, the motor 153 drives a stylus or pen 154 to record upon a chart 156 the level of the signals developed across the capacitor 135, thus producing a curve 157 indicative of the velocity function of the earth formations at each borehole depth. The curve 157 includes "S curve" errors of the type described above caused by cavities or abrupt changes in borehole diameter, one such "S curve" being indicated by the reference numeral 157a in FIG. 5.

During the second run or pass of the tool 110 through the borehole, another curve or log like that indicated at 157 is produced in a manner which will be obvious from the preceding description. The latter log contains an "S curve" error at exactly the same borehole depth as the error 157a appearing on the record made during the first run but its polarity or direction of swing at any given depth is very nearly opposite to that occurring during the first run. This difference in polarity results from the difference in configuration of the borehole transmtiter and receivers during the two runs. To eliminate this error and all similar ones, the two records are reproduced or played back by means of the apparatus shown in FIG. 7. More specifically, the signals recorded on the record made during the first run are reproduced by reproducing equipment indicated generally by reference numeral 170 while those signals recorded on the record made during the second run are reproduced by similar equipment 171. The two sets of signals are reproduced simultaneously and are supplied to summing amplifiers 172 which add together the reproduced signals on a point by point basis to develop a single output. The two logs being "averaged" are identical whenever the receivers are adjacent to uniform diameter sections of borehole but at depths corresponding to cavities or the like these logs contain "error" signals of essentially equal amplitude but of opposite direction and, as a result, the output of the averaging circuit 172 is free of the S type error signals and depicts only formation velocity. The output is recorded by suitable recording apparatus 173 to provide a single velocity curve.

The records made during the two runs may be of the reproducible type and, to this end, magnetic or other reproducible type recording may be employed. However, the records may also be of the variable amplitude, non-reproducible type in which case the reproducing devices 170 and 171 are of the curve follower type described and claimed in pending applications Serial Nos. 605,847, now abandoned and 819,708 respectively filed by James E. Hawkins and Edward J. Crossland on August 23, 1956 and June 11, 1959, which applications are both assigned to the same assignee as the present invention.

In any event, it will be apparent that the composite curve produced by the recorder 173 is free from "S curve" errors of the type described since the summation procedure employed during playback effectively cancels these errors. To provide a better understanding of the manner in which these errors are cancelled let it be assumed that during the first run with the tool 110 being raised in the borehole, the near receiver 118 enters a cavitated region of the borehole while the transmitter 116 and the receiver 119 are positioned within uniform diameter portions of the borehole. The impulse reaching the receiver 118 is thus delayed for an interval corresponding to the increased travel time through the borehole fluid in the cavity area and, as a result, the pulses 125b and 146b are delayed. Thus, the start of the sawtooth 148b is delayed and the curve falsely indicates a high velocity which is in error by an amount corresponding to the delay occasioned by the borehole fluid in the cavity. As the tool 110 continues upwardly, the near receiver 118 emerges from the cavity and the far receiver 119 enters the cavitated area thus producing a false low velocity indication on the curve in a manner which will be obvious. During production of the second run, the tool 110, of course, reaches the same position in the borehole. The records produced during the two runs are correlated with respect to borehole depth so that corresponding time positions are indicative of equal depths of the tool within the borehole. When the tool 110 is again moved upwardly the receiver 118 first enters the cavitated region but this reciever is now the far receiver in the system. The receiver 119 and the transmitter 117 are, at this time, located within uniform diameter portions of the borehole and, hence, the impulse arriving at the now far receiver 118 is delayed by the travel time of the impulse through the borehole fluid in the cavity. Thus, the pulse 126b and the pulse 149b are delayed to cause the curve to deviate from the true velocity by indicating falsely a low velocity condition. It will be recalled that at the same depth during the first run the error signal produced a high velocity error. More specifically, the D.C. voltage across the condenser 135 and, hence, the signal recorded at the particular borehole depth being considered are decreased by an amount corresponding to the delay occasioned by the cavity fluid, thus indicating a low velocity formation where none exists. When the signal recorded at this depth is reproduced and composited by the amplifiers 172 with the corresponding signal produced during the first run at exactly the same depth, the error in the former signal is balanced or compensated by the error in the latter signal so that the composite signal is free of the error. A similar action takes place at all other borehole depths and, as a result, the final curve recorded by the device 173 does not contain the "S curve" errors.

In view of the foregoing description it will be recognized that all of the described embodiments of the present invention result in the substantial elimination of the "S curve" errors. Moreover, all of these embodiments are admirably suited for use in conjunction with the latest well logging procedures involving relatively close spacing of the transmitters and receivers where greater resolution is desired.

While the present invention has been described in connection with particular embodiments thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. Apparatus for producing a log of the acoustic properties of earth formations adjacent a borehole comprising first and second transmitters for supplying impulses at different times to the earth formations and first and second receivers, said transmitters and receivers being arranged in line and adapted to be moved through the borehole, said transmitters being so spaced from said receivers that the difference between the first transmitter-first receiver spacing and the first transmitter-second receiver spacing is equal to the difference between the second transmitter-second receiver spacing and the second transmitter-first receiver spacing, a single recorder channel including an integrating element, a first circuitry interconnecting said recorder channel, said receivers and a first of said transmitters for developing first electrical difference signals proportional to the difference in travel times of the impulses arriving at said first and second receivers from said first transmitter, a second circuitry interconnecting said recorder channel, said receivers and a second of said transmitters for developing second electrical difference signals proportional to the difference in travel times of the impulses arriving at said first and second receivers from said second transmitter, and switching means in said first and second circuitries to alternately connect said first and second electrical difference signals to said recorder channel, said single recorder channel being effective in response to said first and second electrical difference signals to develop a single curve representing an average of the travel time difference between impulses arriving at the two receivers from the first transmitter and the travel time difference between impulses arriving at the two receivers from the second transmitter so that the effects of non-uniformities of the diameter of the borehole are minimized.

2. The apparatus defined by claim 1, wherein the first and second receivers are located vertically between the first and second transmitters.

3. The apparatus defined by claim 1, wherein the first and second transmitters are located vertically between the first and second receivers.

4. The apparatus defined by claim 1 wherein means are provided for rendering the first and second transmitters alternately operative as they are moved through the borehole, and wherein means are provided for rendering said first circuitry operative in synchronism with the operation of said first transmitter and for rendering said second circuitry operative in synchronism with the operation of said second transmitter.

5. The apparatus as defined by claim 1 wherein said first and second circuitries are connected to said recorder channel during alternate runs through the borehole.

6. The apparatus as defined by claim 1 wherein said recorder channel includes a pen type recorder and wherein the first and second transmitters are rendered alternately operative at a sufficiently high rate to prevent changes of said recorder in response to each transmitter impulse, whereby said recorder channel develops a curve representing the average of the first and second difference signals produced during the transmission of several impulses.

References Cited in the file of this patent

UNITED STATES PATENTS

| | | |
|---|---|---|
| 2,018,737 | Owen | Oct. 29, 1935 |
| 2,233,992 | Wyckoff | Mar. 4, 1941 |
| 2,469,383 | Gibbs et al. | May 10, 1949 |
| 2,631,270 | Goble | Mar. 10, 1953 |
| 2,704,364 | Summers | Mar. 15, 1955 |
| 2,708,485 | Vogel | May 17, 1955 |